US006338693B1

(12) United States Patent
Scholten et al.

(10) Patent No.: US 6,338,693 B1
(45) Date of Patent: Jan. 15, 2002

(54) PIVOT-HUNG DOOR DRIVE

(75) Inventors: Jan Scholten, Essen; Peter Kisters, Goch, both of (DE)

(73) Assignee: Dorma GmbH + Co. KG, Ennepetal (DE)

( * ) Notice: Subject to any disclaimer, the term of this patent is extended or adjusted under 35 U.S.C. 154(b) by 0 days.

(21) Appl. No.: 09/482,363

(22) Filed: Jan. 13, 2000

(30) Foreign Application Priority Data

Jan. 14, 1999 (DE) ........................................ 199 01 229

(51) Int. Cl.[7] .......................... H02P 1/00; F16H 55/06; E05F 11/24

(52) U.S. Cl. ................................ 477/7; 74/462; 49/340

(58) Field of Search ................................ 477/7; 49/340, 49/341, 342, 336; 74/421 R, 421 A, 422, 462; 318/3, 9, 445; 16/62

(56) References Cited

U.S. PATENT DOCUMENTS

| | | | | | |
|---|---|---|---|---|---|
| 1,684,704 | A | | 9/1928 | Hubbell et al. | |
| 2,256,613 | A | | 9/1941 | Forman et al. | |
| 3,874,117 | A | * | 4/1975 | Boehm | 49/340 X |
| 4,333,270 | A | | 6/1982 | Catlett | |
| 4,339,843 | A | * | 7/1982 | Burnett, Jr. | 49/340 X |
| 4,429,490 | A | * | 2/1984 | Zunkel | 49/340 X |
| 4,551,946 | A | * | 11/1985 | Yoshida et al. | 49/340 |
| 5,018,304 | A | * | 5/1991 | Longoria | 49/340 |
| 5,507,120 | A | * | 4/1996 | Current | 49/340 |
| 5,687,507 | A | * | 11/1997 | Beran | 49/340 |
| 5,878,530 | A | * | 3/1999 | Eccleston et al. | 49/340 X |
| 5,910,075 | A | * | 6/1999 | Arnell et al. | 49/340 X |
| 6,002,217 | A | * | 12/1999 | Stevens et al. | 49/340 X |
| 6,154,924 | A | * | 12/2000 | Woo | 16/62 |

FOREIGN PATENT DOCUMENTS

| | | |
|---|---|---|
| DE | 3202930 | 8/1983 |
| DE | 3645313 | 10/1987 |
| DE | 3730114 | 5/1988 |
| DE | 4124282 | 1/1993 |
| WO | 8911578 | 11/1989 |

* cited by examiner

*Primary Examiner*—Sherry Estremsky
*Assistant Examiner*—Roger Pang
(74) *Attorney, Agent, or Firm*—Nils H. Ljungman & Associates

(57) ABSTRACT

A pivot-hung door drive system with an electro-mechanical or electro-hydraulic drive device that supplies the opening and closing moment required to open and close a connected pivot-hung door panel, whereby an electronic regulation/control system with at least one memory and at least one microprocessor, on the basis of sensor signals, controls the opening or closing moment by means of a gear wheel that is located on an output shaft, which gear wheel is connected by means of a linkage and an actuator arm with the pivot-hung door panel, whereby between the output shaft of the pivot-hung door drive system and the linkage or the actuator arm, there is a device that effects a change in the opening and closing moment over the angle of rotation of the pivot-hung door panel.

20 Claims, 9 Drawing Sheets

PIVOT-HUNG DOOR DRIVE

BACKGROUND OF THE INVENTION

1. Field of the Invention

The present invention relates to a pivot-hung door drive system with an electro-mechanical or electro-hydraulic device that supplies the opening and closing moment required to open and close a connected pivot-hung door panel.

2. Background Information

German Patent No. 41 24 282 C2 describes a pivot-hung or swinging or swiveling door drive system in which the connected door is automatically opened electro-mechanically by the pivot-hung door drive system. The closing process is carried out with the assistance of the motor drive by an integrated closing spring which can be located in a commercially available door closer, for example. In that case, a reduced drive moment is applied to the motor drive, whereby the motor only makes up the losses in the gear train. This type of control eliminates the need for a continuous engagement of the coupling, and simultaneously results in reduced wear, because the coupling does not need to be re-engaged for the reversing process of the pivot-hung door. This pivot-hung door drive system is equipped with a scissors-type linkage.

Such a drive system can be installed on the door frame or on the door. In addition to the scissors-type or pantograph linkage described above, a parallel linkage and a slide rail in connection with a straight actuator arm can also be used. While the closing moments for scissors-type and parallel linkages are sufficient for standard tasks, the closing moments or movements for the closing process are generally very low when a slide rail is used.

German Patent No. 37 30 114 A1 describes a device for opening and closing doors that consists of two mounting parts. The one part is fastened to the door leaf and the other part of the device is fastened on the frame side, whereby the two mounting parts are connected to each other by a force transmission mechanism. At the same time, there is a reversing mechanism with a locking coupling, which simultaneously limits the forces to be transmitted. For this purpose, conventional, commercially available door closers can be used, although they must have a closing spring. The drive wheel of the device, which is connected on one end with the force transmission mechanism, has a pinion which is effectively connected with a rack.

WO 89/11578 describes a drive system for a pivot-hung door that operates in a similar fashion. In this case, there is a device for the opening process, and the closing process is accomplished, as in DE 41 24 282 C2, by the force of a door closer.

Similar drive systems for pivot-hung doors are described in U.S. Pat. No. 1,684,704 and U.S. Pat. No. 2,256,613. There again, drive systems are described in connection with door closers, although the door closer is installed as a separate component on the door panel, and the drive system for the pivot-hung door is located above the door panel. The connection between the drive system for the pivot-hung door and the door closer is in the form of a scissors-type linkage. U.S. Pat. No. 4,333,270 discloses a drive system for a pivot-hung door that works electro-magnetically. In this case, a drive wheel interacts with a rack, so that a spring for the closing of the door is stretched during the opening process.

German Patent No. 32 02 930 A1 discloses an electro-mechanical pivot-hung door drive system that uses a direct-current motor in connection with a planetary gear train for the drive system. There is a toggle lever linkage between the output shaft and the connected door. This drive system for a pivot-hung door is used for both the opening process and the closing process of the door to which it is connected.

An advertising brochure published by DORMA GmbH+ Co. KG describes an electro-hydraulic drive system designated Model ED 200 designed for use with a pivot-hung door. The drive system in question is a compact drive unit that opens the door against the force of a spring and mechanically returns the door to the closed position using the restoring forces of the spring. This drive system can thereby be installed on the door frame or on the door. In this system, an electric motor drives a pump which pumps a corresponding volume of oil into a hydraulic cylinder, which in turn expands against the force of a spring. The piston of the hydraulic cylinder is thereby provided with gear teeth that drive a pinion, to which the lever mechanism that actuates the door is attached. To return the door to the closed position, appropriate valves are opened and the volume of oil can flow back into the reservoir of the drive unit. The spring thereby pushes the piston back and closes the door by its movement, which is transmitted to the pinion.

OBJECT OF THE INVENTION

One object of the present invention is therefore to improve a pivot-hung door drive system described in some publications so that, to avoid the above-mentioned disadvantages, an essentially simple construction and an essentially easy adaptation to the desired torque curves over the opening angle become possible.

SUMMARY OF THE INVENTION

The object can be accomplished, in at least one embodiment according to the present invention, in a pivot-hung door drive system, in which there can be a device that effects a change in the opening and closing moment over the angle of rotation of a corresponding pivot-hung door panel. Additional possible embodiments of the present invention are described in the features shown herein.

The present invention teaches that the force curve/torque curve that changes over the opening angle of a door or swivelling panel can be influenced during both the opening and the closing of the door by means of a transmission in the form of a device with a translation ratio that varies over the opening angle, which translation ratio can substantially easily be achieved by easily manufactured eccentrically located gear wheels that have a circular gear rim.

The present invention therefore teaches a transmission that varies its translation ratio over the opening angle or angle of rotation of the door and can have a first and a second gear wheel that are engaged with each other and are each formed by a circular gear rim, which gear wheels are mounted so that they retain their axial separation eccentrically with respect to their center points. The first gear wheel can be connected with an output shaft and the second gear wheel can be connected with a gear wheel of the drive device, whereby the axis of rotation of the output shaft runs through the center of motion of the first gear wheel, and whereby essentially everything is arranged so that the eccentricity of the gear wheels that results from the center point of a gear wheel and the new center of motion lies substantially centrically symmetric or point-symmetric to their pitch point.

The torque curves can then be substantially easily defined and determined by the selection of the eccentricity, the pitch circle diameter and the resulting distance between the axes of rotation of the two gear wheels. Many different translation ratios can thereby become possible, and thus the ability to adapt the system to the desired torque characteristic over the opening angle, without the need to manufacture special cam plates.

Instead, the present invention teaches that commercially available gear wheels can be used, which can significantly reduce the manufacturing costs. The gear wheels can in particular have standard gearing or gear design.

The magnitude of the eccentricity can be described by the ratio of the magnitude of the eccentricity to the base circle diameter. In particular, this ratio should not exceed a ratio value of 0.137 for gearings according to DIN 867. The transmission action of the transmission, however, deteriorates significantly when this value is exceeded, because the profile overlap can drop below 1.

In one embodiment of the present invention, the pivot-hung door drive system can be realized in the form of a top-mounted drive with a lever arm which effectively varies over the range of rotation between a coupling point of the swinging door panel and another coupling point outside the swinging panel, which lever arm can be engaged with the output shaft.

The effective lever arm can be preferably formed by a slide-rail linkage and a toggle-lever linkage.

As an alternative to the configuration described above, the drive system for the pivot-hung door can also be realized in the form of an under-floor drive system, in which case the output shaft interacts with the bearing of the swinging door panel.

A possible object of the present invention, in at least one possible embodiment, may be accomplished by the fact that between the output shaft of the Divot-hung door system and the linkage or the actuator arm, there may be a device that effects a change in the opening and closing moment over the angle of rotation of the pivot-hung door panel.

It is desirable to increase the moments for the closing range in the range of essentially small door opening angles, for example.

In one possible embodiment of the present invention, the present invention may include a door piston that is guided in a housing, whereby the drive shaft or output shaft of the door piston may be connected to a door by means of an actuator arm or a linkage. There may also be an energy storage mechanism in the form of a spring, which spring can store energy during the opening of the door and can release it again for a subsequent automatic closing process.

In another possible embodiment of the present invention, the present invention may include a door closer, which door closer may have at least two different translation ratios, as a function of direction and of the distance traveled by the door, whereby a fixed or solid coupling between the opening force and the closing force applied to the door may be neutralized by the fact that, between the spring and the door piston, there may be at least one hydraulic transmission, which hydraulic transmission may include at least one spring piston, the door piston, and an inner piston inside the door piston, as well as a chamber that is defined by the inner piston and a housing surrounding the inner piston.

In other words, in another possible embodiment of the present invention, the present invention may include a door closer such that with a usually high closing moment, only a usually small opening moment is required to open the door. The small opening moment and high closing moment may be accomplished in that a fixed coupling or translation ratio between the pinion and the output shaft, and thus between the opening and closing force, is not maintained during the opening and closing processes of the invention, which means that the translation ratio between the pinion and the output shaft changes as the door is opened and closed. A hydraulic transmission between the rack and pinion and the actuator arm, which actuator arm actuates the door, may permit a door closer to be configured such that it may generate a high closing moment or force for closing the door but only a small opening moment or force for opening the door. Under certain very special circumstances, the opposite effect may be desirable.

As a result of the translation or conversion of the translation movement of the piston into a rotational movement of the pinion, there is a variation of the reference diameter. The pinion moments can be adjusted by means of the variable lever arm, while the piston or peripheral force on the output pinion remains constant. At the same time, on account of the greater spring force, this or the piston or the peripheral force on the output pinion can be reduced by the interposition of a transmission between the output shaft and linkage. The present invention also teaches that it is possible to reduce the spring travel by means of a further variation of the reference diameter. The curve of the closing moment can be a superimposition of the influences of the translation or transmission function, or the reference diameter and of the spring force curve.

The pinions used in some publications, in contrast to the pinions in the present invention, have a pitch or rolling curve profile that is composed of segmentally constant radii. An example of the solution used for the constructive integration of the variable reference or pitch circle diameter is the principle described in German Patent No. 36 45 313 C2. The result, for the matching gearing associated with the toothed pinion, for example, is a stretched-out S-shaped pitch curve. By an appropriate selection of the profile of the Ditch curve and of the flank angle, the objective is thereby to minimize the friction resulting from the guide wall of the toothed rack. The pinion-side gearing can have varied profile displacements over its pitch curve. In the range of large door opening angles, i.e. of small pitch circle diameters, the gearing can be displaced radially outward by positive profile displacement. Accordingly, a profile displacement in the opposite direction can be made on the toothed rack. The gearing also can have a modulus which varies over the pitch curve. The modulus can be thereby only great enough so that the strength of the gearing is sufficient. The results described here were obtained empirically.

In one possible embodiment of the present invention, the present invention teaches that the desired variable translation ratio may be achieved most efficiently by a separation or decoupling of the necessary lever length changes of the transmission from the function of the conversion of the rotational motion. The result is not only a wide variety of potential adaptations to desired torque curves, but also a greatly economical construction.

In other words, in one possible embodiment of the present invention, there may not be a fixed coupling or translation ratio between the pinion and the output shaft, and thus between the opening and closing force, during the opening and closing processes of the present invention. For example, there may be a hydraulic transmission between the rack and pinion and the actuator arm, which actuator arm actuates the door. Such a transmission may permit a door closer to be configured such that it may generate a high closing moment or force for closing the door but only a small opening moment or force for opening the door. Under certain very special circumstances, the opposite effect may be desirable.

To further explain, the present invention may permit a door to be opened gradually, closed gradually, or opened and closed gradually, without slamming, yanking, or pulling, and without sudden lurches, jerks, swings, or stops. The present invention may also permit a door to be opened suddenly or with an essentially large amount of force, closed suddenly or with an essentially large amount of force, or opened and closed suddenly or with an essentially large amount of force—that is, with slamming, jerking, yanking, or pulling, and with sudden lurches, jerks, swings, or stops. The present invention may further permit the door to be opened gradually and slammed shut or shut suddenly or shut with an essentially great amount of force, or permit the door to be opened suddenly or opened with a great amount of force and shut gradually.

Therefore, in another possible embodiment of the present invention, the present invention teaches the interposition of a device between the output shaft of the pivot-hung door drive system and the force transmission mechanism. The interposed transmission, for example, thereby may transmit an essentially optimum reference circle curve, as a result of which the necessary change in the length of the lever can be separated from the function of the conversion of the translation movement of the piston motion into the rotational movement of the lever. A toothed rack may thereby be paired with a conventional pinion.

In other words, in one possible embodiment of the present invention, the output shaft or closer shaft may be actuated by a spring system in the closing direction. Also, an end of the output shaft or closer shaft may extend out of the door closer housing. The end of the output shaft or closer shaft may be coupled and connected to one end of a linkage arm, an effective lever arm, a slide rail linkage, or an actuator arm, so that the other end of the linkage arm, effective lever arm, slide rail linkage, or actuator arm may interact with a sliding block of a slide rail.

In yet another possible embodiment of the present invention, the present invention teaches that the transmission that varies its translation ratio over the closing and opening angle of the door therefore may have a guide connected with an output shaft and a driver roller that can be moved in a translation movement in this guide, which driver roller can be connected with a pinion that is engaged in a toothed rack that is coupled to the spring system, whereby the axis of rotation of the output shaft and the axis of rotation of the pinion, as well as the axis of rotation of the driver roller and the axis of rotation of the pinion, are located at essentially pre-determined distances from each other, so that when the output shaft and the pinion rotate, the translation ratio may change as a result of the varying axial distance between the output shaft and the driver roller.

In still another possible embodiment of the present invention, the axis of rotation of the driver roller can intersect the pitch circle of the pinion and can be oriented essentially parallel to the axis of rotation of the pinion. The result can be a substantially compact and space-saving construction, but one which essentially simultaneously can take into consideration the desired variable translation ratios over the opening angle of the door panel of the door with which the system is associated.

In other words, the present invention may display several advantages over the known art. For example, the present invention may permit greatly compact and space-saving construction and thus permit the installation of a door drive or door closer in a substantially small space or on an essentially small door or door frame. Also, the present invention may be substantially economical because it may permit substantially simple construction—that is, construction involving an essentially small number of parts—and because the present invention may, for instance, permit use of an essentially weak spring. Additionally, the present invention may greatly reduce wear on the parts and components of the door drive system—for example, the spring, the piston or piston-cylinder structure, and the rack.

The translation ratio of the transmission may be determined by the pitch circle diameter of the pinion, the distance of the axis of rotation of the output shaft from the axis of rotation of the pinion, and by the distance of the driver roller from the axis of rotation of the pinion. By varying these individual values, the translation ratio and thus the torque curve of the pivot-hung door drive system can be varied over the opening angle of the door panel. The result can be different translation ratios and thus the ability to adapt the system to the desired torque characteristics over the opening angle, in which essentially only the above-mentioned components and values may need to be changed.

In one possible embodiment of the invention, the drive system for the pivot-hung door may be realized with an effective lever arm between a coupling point on the rotationally movable door panel of the associated door and an additional coupling point outside the door panel, which lever arm may be varied over the range of rotation and may be engaged with the output shaft.

In another possible embodiment of the invention, the effective lever arm is preferably formed by a slide rail arm.

In other words, the actuator arm or effective lever arm may be formed as a slide rail linkage. The slide rail linkage may be engaged in a guide rail by use of a slide, which may be located at the other end of the actuator arm or effective lever arm.

In yet another possible embodiment of the invention, the effective lever arm or actuator arm or linkage may be formed by a scissors-type or pantograph or parallel linkage arrangement.

In yet another possible embodiment of the invention, the effective lever arm or actuator arm or linkage may be formed by a toggle-lever arrangement.

Someone skilled in the art would be able to determine the characteristics of the drive system based, for example, upon the weight and size of the door, the location in which the door is installed, the purpose or purposes for which the door is used, the circumstances under which the door is used or installed, and the type of linkage or actuator arm used.

The above discussed embodiments of the present invention will be described further hereinbelow with reference to the accompanying figures. When the word “invention” is used in this specification, the word “invention” includes “inventions”, that is, the plural of “invention”. By stating “invention”, the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Additional advantages and features of the invention are described in greater detail below, with reference to one exemplary embodiment of the invention that is illustrated in the accompanying drawings, in which.

DESCRIPTION OF THE PREFERRED EMBODIMENT

Figure 1:
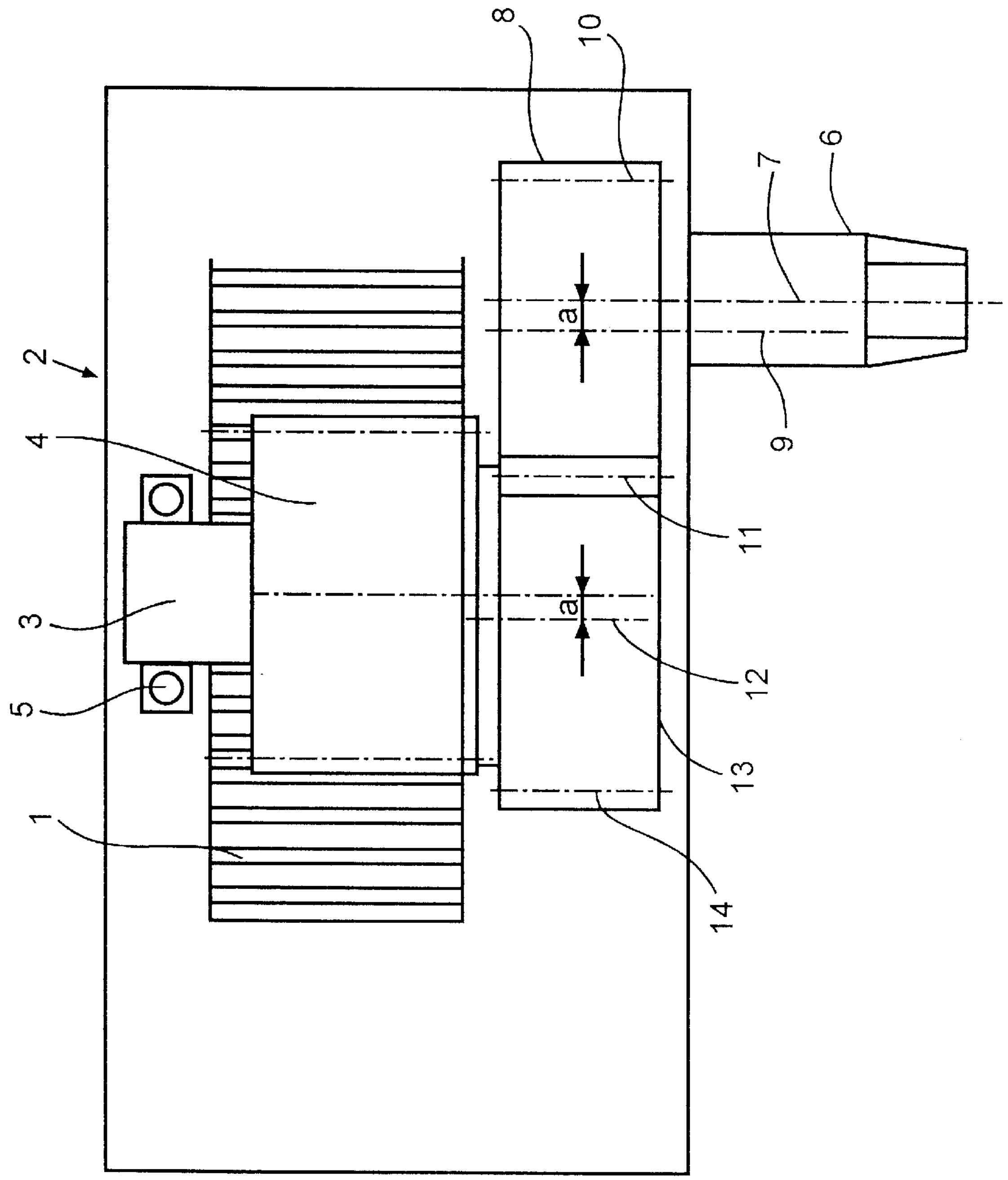
FIG. 1 is a schematic detail of a device of the pivot-hung door drive system.

The transmission of the device 2, a detail of which is shown in FIG. 1, is connected with a gear wheel 1 which is located on a shaft (not shown) of the pivot-hung door drive system. Effectively connected to this gear wheel 1 is an additional gear wheel 4, whereby the axis of rotation 3 of the gear wheel 4 and the axis of rotation of a gear wheel 13 are identical.

The gear wheel 13 is engaged with an additional gear wheel 8 which is connected with an output shaft 6 that extends out of the device. The output shaft 6 is coaxial with an axis of rotation 7 of the gear wheel 8.

The two gear wheels 13 and 8 are provided with a standard or normal gearing, and are mounted with regard to their center axes 12 and 9 respectively so that they rotate eccentrically by a predetermined amount a. The axis of rotation 3 of the gear wheel 13 is thus separated from its center axis 12 and the axis of rotation 7 of the gear wheel 8 from its center axis 9 by the distance a.

A toggle-lever linkage or a sliding-rail linkage can be engaged in the manner of the known art with the output shaft. The pivot-hung door drive, however, can also be realized in the form of an under-floor drive system, whereby the output shaft 6 then interacts with a bearing (no- shown here) of a swinging door panel.

In at least one possible embodiment of the present invention as shown in FIG. 1, a bearing 5 is shown as part of the device 2. Pitch circle 14 is shown corresponding to a gear wheel.

Figure 2:
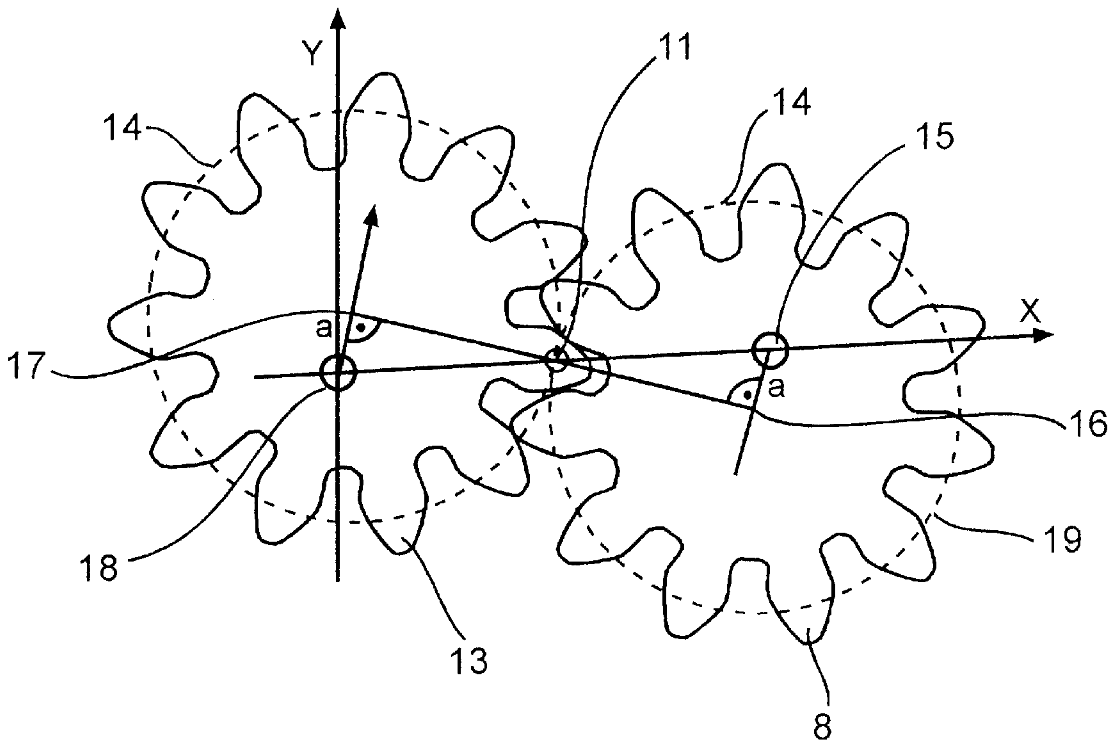
FIG. 2 shows the two gear wheels of the device illustrated in FIG. 1 with regard to the position of the center of motion and center point.

FIG. 2 shows the gear wheels 13 and 8 engaged with one another in connection with an xy coordinate system, whereby the x-axis connects the two centers of motion 18 and 15 formed by the axis of rotation 3 and 7 with each other. The center points 17 and 16 formed by the center axes 12 and 9 are each at a distance from the corresponding centers of motion 18 or 15 which determines the eccentricity. The center points 17 and 16 relate to a circular gear rim of the respective or corresponding gear wheels 13 and 8 with a circular root circle, tip circle, pitch circle, etc.

As shown in FIG. 2, the eccentricities a formed by the center point 17 and the center of motion 18 and by the center point 16 and the center of motion 15 are centrically symmetric at a pitch point 11 of the two gear wheels 13 and 8 that are engaged with each other, at which point the two pitch circles 10 and 19 of the gear wheels 13 and 8 touch.

The gear wheels 13 and 8 have shapes that correspond to each other. It is thereby possible that, as the gear wheels 13 and 8 turn, the distance from the center of motion 18 to the pitch point 11 increases or decreases by the amount by which the distance between the center of motion 15 and the pitch point 11 decreases or increases respectively. The distance between the centers of motion 18 and 15 of the two gear wheels 13 and 8 with respect to each other, however, remains constant during the rotation of the gear wheels 13 and 8.

The present invention can make it possible in a substantially simple manner to vary the translation ratio during the rotation of the gear wheels 13 and 8, and thus of the output shaft 6. Over the opening angle of a swinging-door panel, it thereby becomes possible to have an influence on the lever arm, for example, that is effectively varied by a slide-rail linkage, and thus an influence on the force and torque curve that is varied over the opening angle. Depending on the eccentricity and the pitch circle diameter, the translation ratio can easily be adapted to pre-determined torque curve characteristics.

Figure 3:
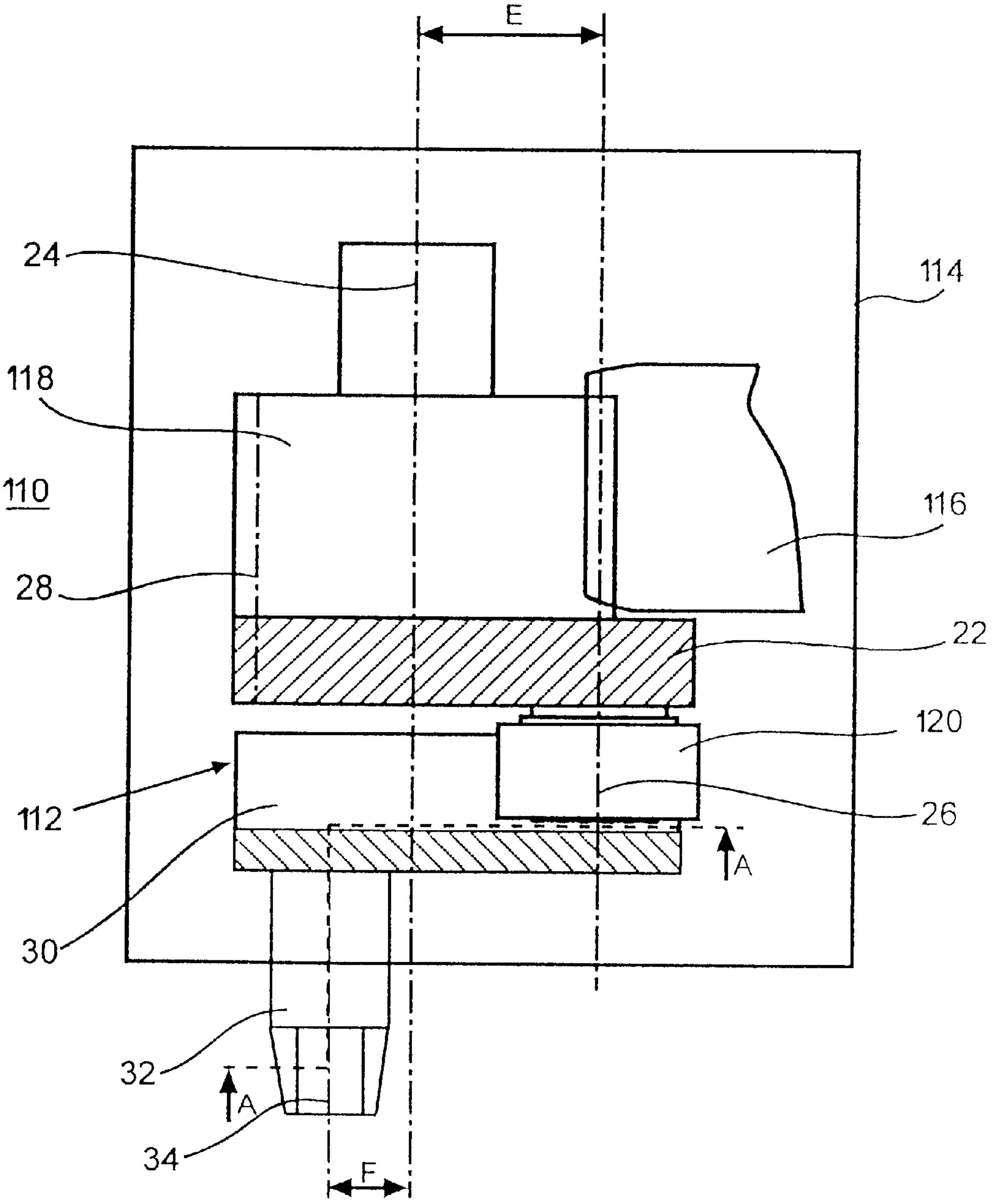
FIG. 3 is a schematic sectional view of the transmission of the pivot-hung door drive system according to at least one possible embodiment of the present invention.

FIG. 3 is a schematic view of a device 110 with a transmission 112, which is located in a housing 114 of the pivot-hung door drive system. The illustrated embodiment does not show the parts of the pivot-hung door drive system that are described in some publications.

The transmission 112 thereby interacts with a toothed rack 116. Engaged in the toothed rack 116 is a pinion 118 which is firmly connected with a driver 22 that supports a driver roller 120, whereby the axis of rotation 24 of the pinion 118 and the axis of rotation of the driver 22 are essentially identical.

In other words, the pinion 118 and the driver 22 may have the same axis of rotation 24.

The axis of rotation 26 of the driver roller 120 is located at a distance E from the axis of rotation 24, so that the axis of rotation 26 intersects the pitch circle 28 of the pinion 118. The axes of rotation 24 and 26 are oriented essentially parallel to each other.

The driver roller 120 is located between a guide 30, or between the two guide rails 36 and 38 that form the guide 30, which is firmly connected with an output shaft 32 that projects out of the housing 114. The axis of rotation 34 of the output shaft 32 and the axis of rotation of the guide 30 are therefore essentially identical.

In other words, the output shaft 32 and the guide 30 may have the same axis of rotation 34.

The axis of rotation 34 of the output shaft 32 and the guide 30 is located at a distance F from the axis of rotation 24 of the pinion 118 and of the driver 22.

A sliding rail arm (not shown) may be engaged on the output shaft 32.

When the door panel to which the pivot-hung door drive system, for example, is attached is opened, the output shaft 32 is rotated. The driver roller 29 is moved by means of a guide 30 that consists of two guide rails 36 and 38—see FIGS. 4 and 5—i.e. the force transmitted by the opening of the door to the output shaft 32 and the guide 30 is transmitted via the guide 30 to the driver roller 120 and thus to the driver 22 and the pinion 118. The driver roller 120 is thereby guided in translation relative to the guide 30. The pinion 118 moves the toothed rack 116 during the opening and closing by the drive motor by means of a control system, on the basis of a sensor signal.

Figure 5:
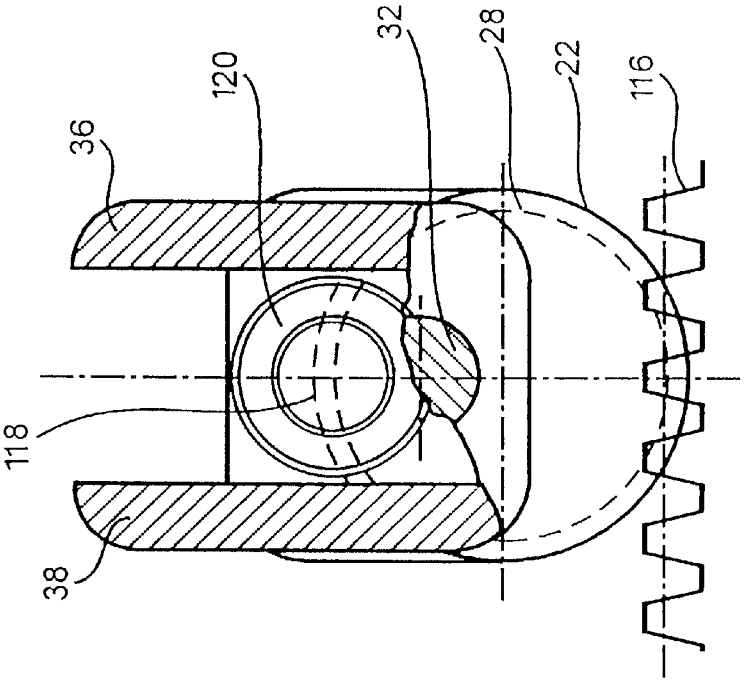
FIG. 4 and FIG. 5 are views along Line A—A in FIG. 3 in positions rotated by 180 degrees.
Figure 4:
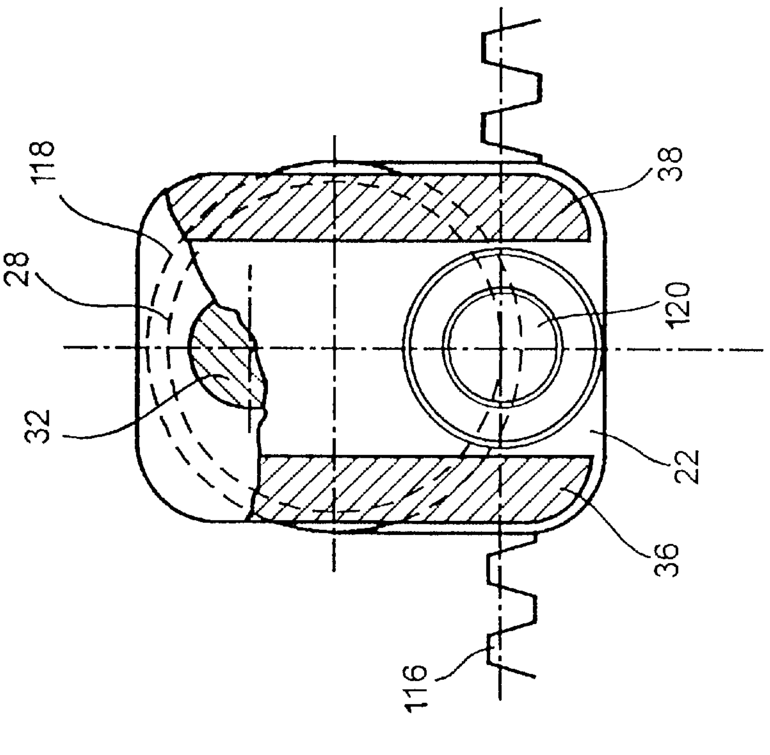

As shown in FIGS. 4 and 5, as the output shaft 32 rotates, and thus the driver 22 with the pinion 118, the relative position of the axis of rotation 26 of the driver roller 120 with respect to the axis of rotation 34 of the output shaft 32 changes. FIGS. 4 and 5 show positions of the transmission 112 in partial section along Line A—A rotated by 180 degrees. The maximum distance of the axis of rotation 26 of the driver roller 120 from the axis of rotation 34 of the output shaft 32 is illustrated in FIG. 4, and the minimum distance of the axis of rotation 26 of the driver roller 120 from the axis of rotation 34 of the output shaft 32, are illustrated in FIG. 5.

As a result of the changing length of the lever arm between the two axes of rotation 26 and 34, the force curve that results over the opening angle changes. The translation ratio of the transmission 112 is determined by the diameter of the pitch circle 28, of the pinion 118, of the distance F of the axis of rotation 34 of the output shaft 32 from the axis of rotation 24 of the pinion 118, and by the distance E from the axis of rotation 26 of the driver roller 120 to the axis of rotation 24 of the pinion 118.

The force curve over the opening angle of the door panel can be influenced, and can thereby be essentially easily defined, by varying these dimensions.

In other words, the force curve over the opening of the door panel can be essentially easily influenced by varying the changing length of the lever arm between the two axes of rotation 26 and 24, the diameter of the pitch circle 118, the diameter of the pinion 118, the distance F of the axis of rotation 34 of the output shaft 32 from the axis of rotation 24 of the pinion 118, and by the distance E from the axis of rotation 26 of the driver roller 120 to the axis of rotation 24 of the pinion 118, the size of the driver roller 120, and the weight and the size of the door.

Over the opening angle of a door panel of a door, it thereby becomes possible to influence in a greatly simple manner the effective length of the lever arm which is changed by the sliding rail arm, and thus to influence the force and torque curve that changes over the opening angle of the door panel.

This influence is possible both in electro-mechanical and electro-hydraulic pivot-hung door drive systems, and also on pivot-hung door drive systems which are considered opening assistance mechanisms, i.e. when the connected door panel is opened, a spring is simultaneously stretched, which provides the force for the subsequent closing of the door without the drive system.

Figure 6:
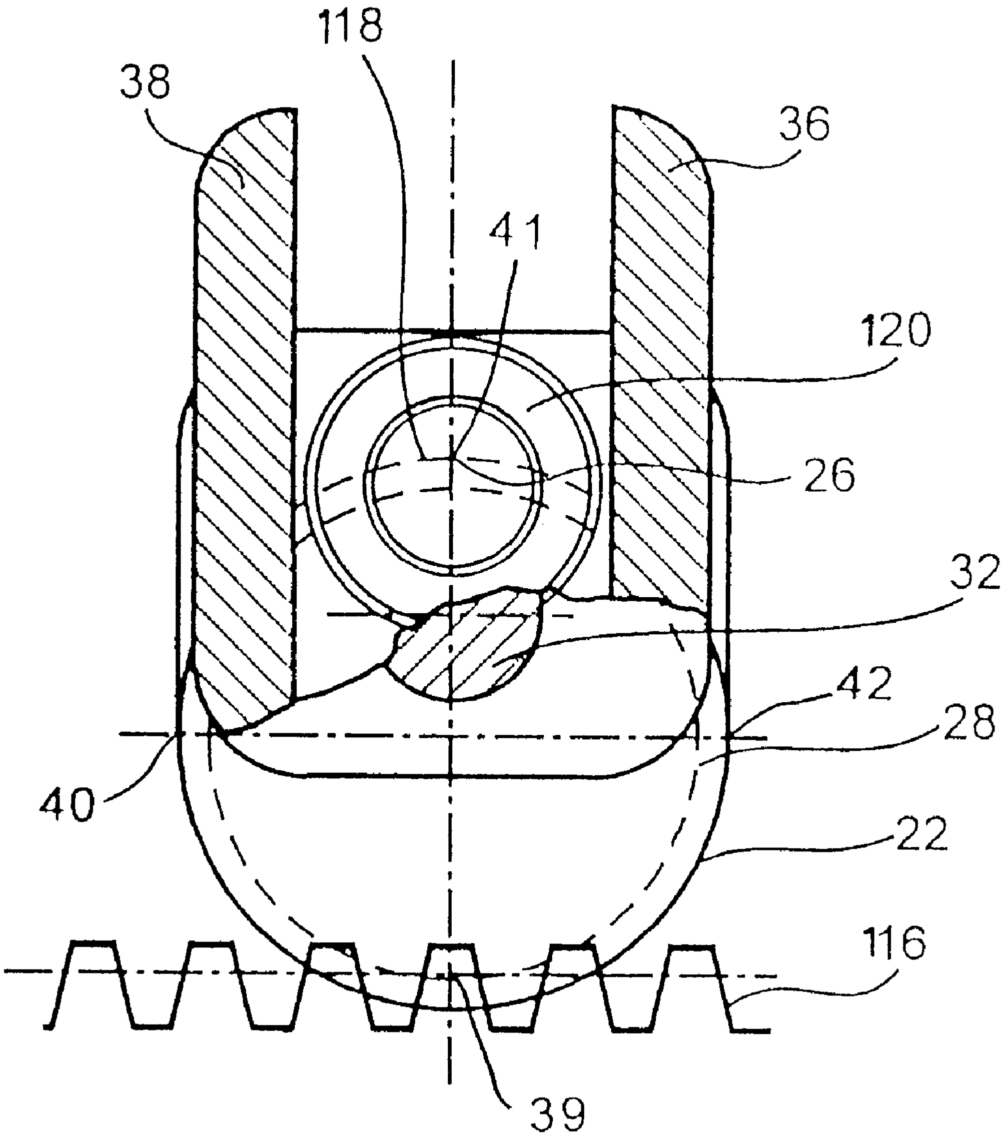
FIG. 6 is a duplicate of FIG. 5 having additional information.

FIG. 6 shows the axis of rotation 26 of the drive roller 120 and the output shaft 32. In one possible embodiment of the invention, the driver roller 120, the output shaft 32, and the guide rails 38 and 36 may rotate counterclockwise from the extreme top point 41, to the extreme right point 42, to the extreme bottom point 39, to the extreme left point 40, or may rotate counterclockwise vice versa. That is, the driver roller 120, the output shaft 32, and the guide rails 38 and 36 may be able to rotate from 90 degrees to 360 degrees. If the drive roller 120 rotates clockwise or counterclockwise to the extreme right point 42, the guide rails 38 and 36 are shifted to the right. If the drive roller 120 rotates clockwise or counterclockwise to the extreme left point 40, the guide rails 36 and 38 are shifted to the left.

Figure 7:
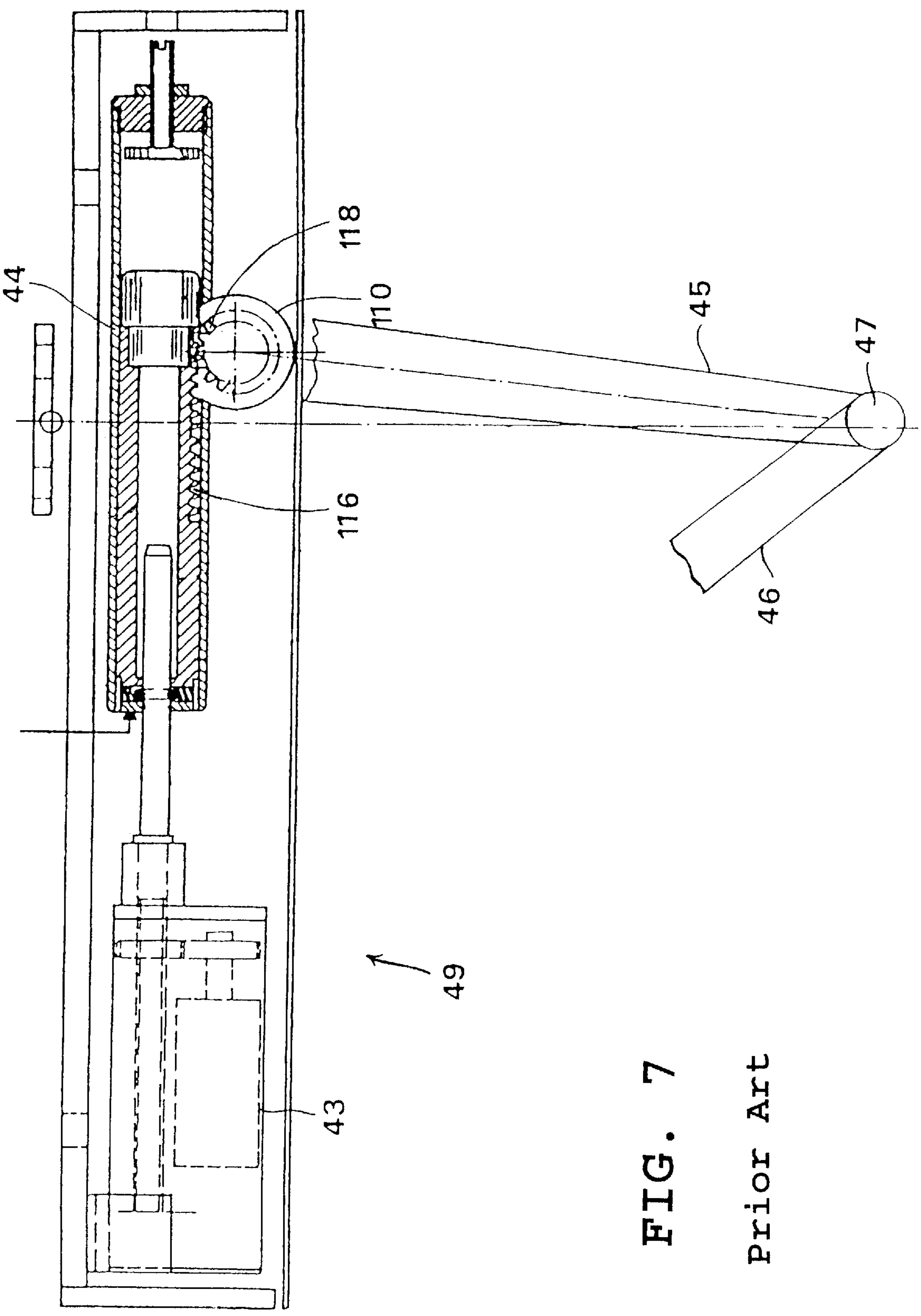
FIG. 7 Prior Art
FIG. 7 is a schematic sectional view of a possible arrangement of a door drive system in which a rack and pinion, a device, a piston structure, and a motor are used according to at least one possible embodiment of the present invention.

FIG. 7 is a copy of the figure from German Patent No. DE 37 30 114 A1, having the German title "Vorrichtung zum Oeffnen and Schliessen von Tueren", having the inventor Tschanz, filed in Germany on Sep. 8, 1987, and laid open May 11, 1988, from which copy of which figure all of the reference numerals present in the original figure, as it appears in German Patent No. DE 37 30 114 A1, have been removed. German Patent No. DE 37 30 114 A1 is hereby incorporated by reference as if set forth in its entirety herein. The reference numerals that have been removed from the figure for this German Patent, essentially reproduced herein as FIG. 7, indicate structures and arrangements that are well known in the prior art.

In one possible embodiment of the present invention, illustrated in FIG. 7, the present invention includes a door closer 49, which door closer 49 involves a motor 43, a piston-cylinder structure 44, a rack 116 and a pinion 118, and a device 110 between a linkage or actuator arm and the rack 116 and pinion 118. In the embodiment illustrated in FIG. 7, the linkage has a first linkage arm 45, a second linkage arm 46, and a connection 47. In other possible embodiments of the present invention, other types of linkages—for example, slide rail linkages—may be used.

In the embodiment of the present invention illustrated in FIG. 7, the motor 43 drives the piston or piston-cylinder structure 44, which piston or piston-cylinder structure 44 is engaged with a rack 116, which rack 116 is in turn engaged with a pinion 118. The pinion 118 is engaged with a device 110, which changes the translation ratio of the door closer 49 as the door is opened or closed. As the door is opened or closed, the motor 43 drives the piston or piston-cylinder structure 44, which piston or piston-cylinder structure 44 thereby drives the rack 116. As the rack 116 moves, it causes the pinion 118 to rotate and thereby actuates the device 110, which causes movement of the first linkage arm 45 and the second linkage arm 46 by means of a connection 47. The device 110 between the rack 116 and the pinion 118 and the linkage, represented by first linkage arm 45, second linkage arm 46, and connection 47, permits the translation ratio of the door closer 49 to change as the door is opened and closed.

Figure 8:
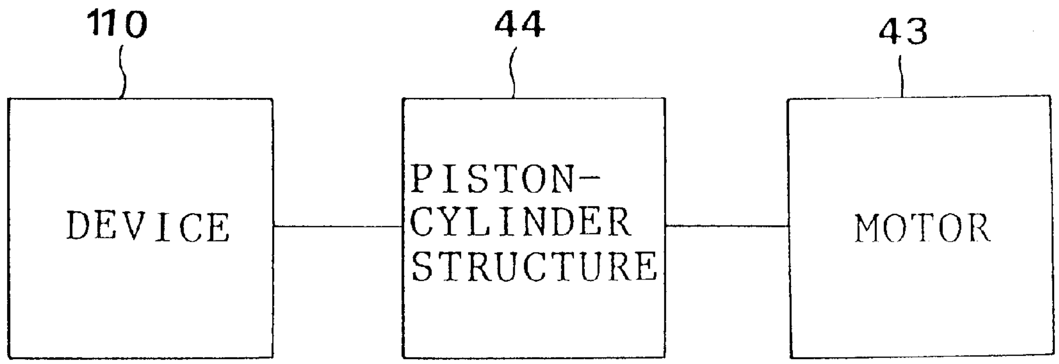
FIG. 8 is a block diagram showing a connection between a device, a piston, and a motor, which connection may be used according to at least one possible embodiment of the present invention.

FIG. 8 illustrates another possible embodiment of the invention, in which a device 110 is connected to a piston or piston-cylinder structure 44, which piston or piston-cylinder structure 44 is connected to a motor 43. The motor 43 drives the piston or piston-cylinder structure 44, which piston or piston-cylinder structure 44 is connected directly to the device 110.

Figure 9:
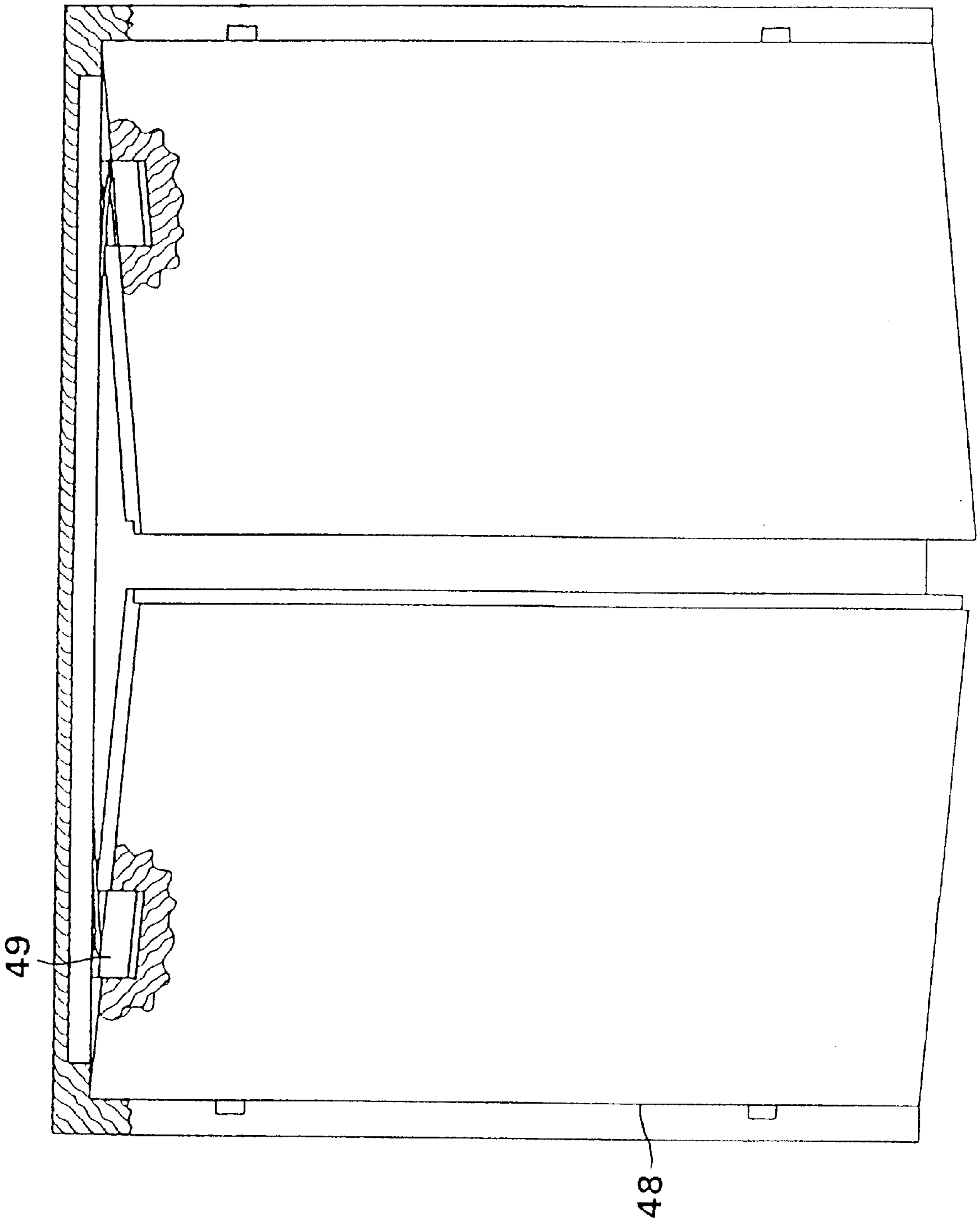
FIG. 9 is a head-on view of a door panel and a door closer, which door panel and door closer may be used according to at least one possible embodiment of the present invention.

FIG. 9 shows a door panel 48 and a door closer 49, which door panel 48 and door closer 49 may be used in a possible embodiment of the present invention. In one possible embodiment of the invention, the door closer 49 may be installed inside the door in the upper area of the door.

Figure 10:
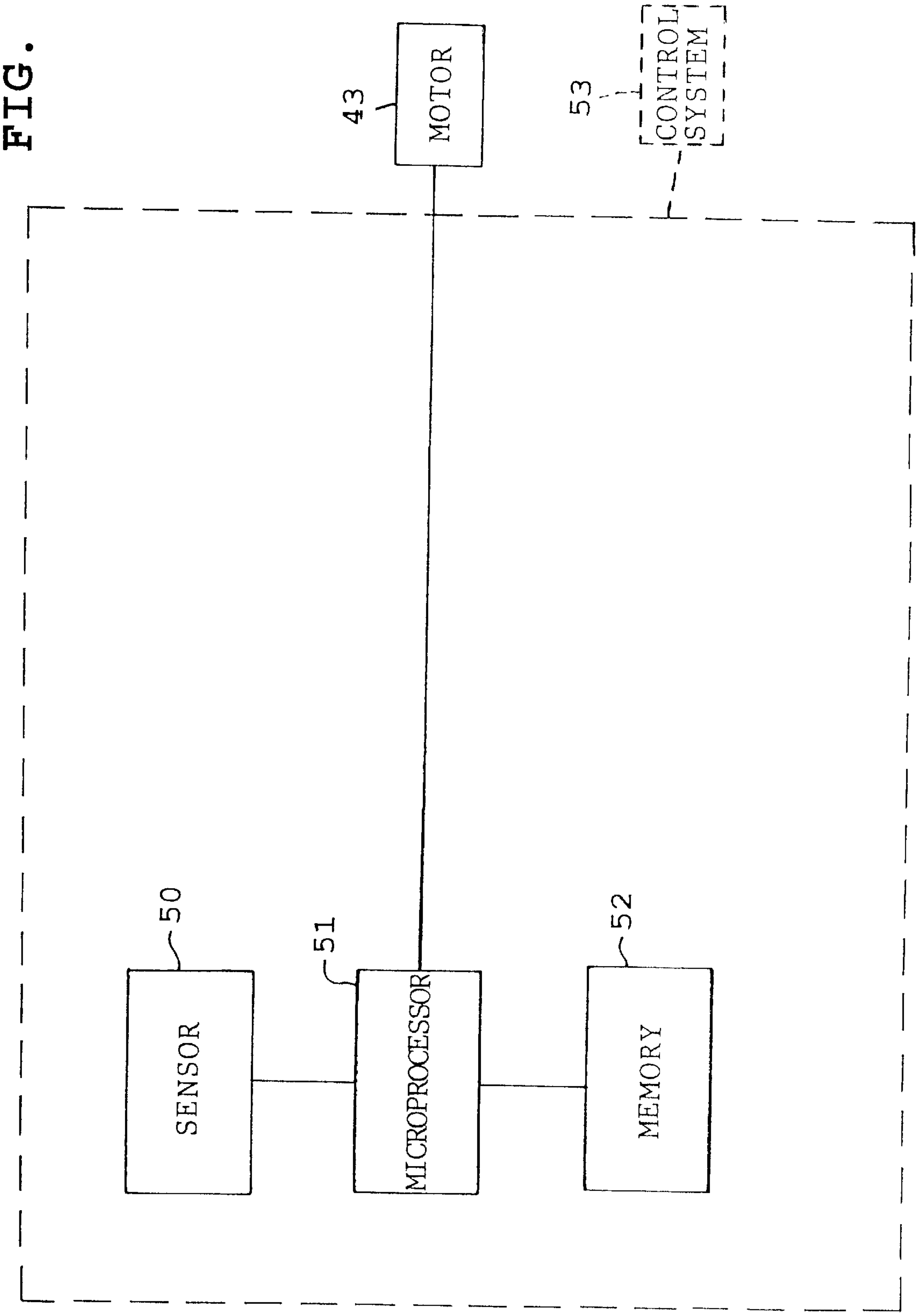
FIG. 10 is a block diagram showing a connection between a motor and a microprocessor, a sensor, and a memory, which connection may be used according to at least one possible embodiment of the present invention.

FIG. 10 illustrates yet another possible embodiment of the invention, in which a motor 43 is connected to a microprocessor 51, which microprocessor 51 is connected to both a sensor 50 and a memory 52, which microprocessor 51, sensor 50, and memory 52 are arranged in a control system 53. In still another possible embodiment of the present invention, more than one microprocessor 51 may be used; more than one sensor 50 may be used; more than one memory 52 may be used; and/or a plurality of microprocessors, sensors, and/or memories may be used.

One feature of the invention resides broadly in the pivot-hung door drive system with an electro-mechanical or electro-hydraulic drive device that supplies the opening and closing moment required to open and close a connected pivot-hung door panel, whereby an electronic regulation/control system with at least one memory and at least one microprocessor, on the basis of sensor signals, controls the opening or closing moment by means of a gear wheel that is located on an output shaft, which gear wheel is connected by means of a linkage and an actuator arm with the pivot-hung door panel, characterized by the fact that between the output shaft of the pivot-hung door drive system and the linkage or the actuator arm, there is a device 2 that effects a change in the opening and closing moment over the angle of rotation of the pivot-hung door panel.

Another feature of the invention resides broadly in the pivot-hung door drive system with an electro-mechanical and electro-hydraulic drive device that supplies the opening and closing moment required to open and close a connected pivot-hung door panel, whereby an electronic regulation/control system with at least one memory and at least one microprocessor, on the basis of sensor signals, supplies the opening moment, whereby directly or indirectly connected with the drive device is a transmission which is connected with a shaft that emerges from a door closer and is connected with the pivot-hung panel by means of an output shaft of the door closer with a linkage or an actuator arm, characterized by the fact that between the output shaft of the pivot-hung door drive system and the linkage or the actuator arm, there is a device 2 that effects a change in the opening and closing moment over the angle of rotation of the pivot-hung door panel.

Yet another feature of the invention resides broadly in the pivot-hung door drive system characterized by the fact that the device 2 is a transmission that varies its translation ratio over the angle of rotation.

Still another feature of the invention resides broadly in the pivot-hung door drive system characterized by the fact that the transmission which varies its translation ratio over the angle of rotation of the pivot-hung door panel has a first and a second gear wheel 8, 13 which are engaged with each other and are each formed by a circular gear rim, are mounted eccentrically with respect to their center points 16, 17 so that they retain their axial separation, and the first gear wheel of which is effectively connected with an output shaft 6 and the second gear wheel 13 of which is effectively connected coaxial to its center of motion 18 with the output gear wheel 1 of the pivot-hung door drive system, whereby the axis of rotation 7 of the output shaft 6 runs through the center of motion 15 of the gear wheel 8, all of which is arranged such that the eccentricity a of the gear wheels 8, 13 resulting from the center point 17, 16 of a gear wheel 8, 13 and the new center of motion 15, 18 lies centrically symmetric to their pitch point 11.

A further feature of the invention resides broadly in the pivot-hung door drive system characterized by the fact that the gear wheels 8, 13 have a standard gearing.

Another feature of the invention resides broadly in the pivot-hung door drive system characterized by the fact that for a gearing according to DIN 867, the ratio of the magnitude of the eccentricity a to the base circle diameter is not greater than 0.137.

Yet another feature of the invention resides broadly in the pivot-hung door drive system characterized by the realization in the form of a top-mounted pivot-hung door drive system with a lever arm which effectively varies over the range of rotation between a coupling point of the rotational door panel and another coupling point outside the rotating panel, which lever arm is engaged with the output shaft 6.

Still another feature of the invention resides broadly in the pivot-hung door drive characterized by the fact that the effective lever arm is formed by a slide-rail linkage.

A further feature of the invention resides broadly in the pivot-hung door drive characterized by the fact that the effective lever arm is formed by a toggle-lever linkage.

Another feature of the invention resides broadly in the pivot-hung door drive characterized by a realization in the form of an underfloor drive, in which the output shaft 6 interacts with the bearing of the swinging door panel.

Yet another feature of the invention resides broadly in the pivot-hung door drive system with an electro-mechanical or electro-hydraulic drive device that supplies the opening and closing moment required to open and close a connected pivot-hung door panel, whereby an electronic regulation/control system with at least one memory and at least one microprocessor, on the basis of sensor signals, controls the opening or closing moment by means of an output shaft which is generated by or connected with a linkage or an actuator arm, characterized by the fact that between the output shaft 32 of the pivot-hung door drive system and the linkage or the actuator arm, there is a device 110 that effects a change in the opening and closing moment over the angle of rotation of the pivot-hung door panel.

Another feature of the invention resides broadly in the pivot-hung door drive system with an electro-mechanical or electro-hydraulic drive device that supplies the opening and closing moment required to open and close a connected pivot-hung door panel, whereby an electronic regulation/control system with at least one memory and at least one microprocessor, on the basis of sensor signals, supplies the opening moment by means of an output shaft, whereby directly or indirectly connected with the drive device is a transmission which is connected with a shaft that emerges from a door closer and is connected with the pivot-hung panel by means of an output shaft of the door closer with a linkage or an actuator arm, characterized by the fact that between the output shaft of the pivot-hung door drive system and the linkage or the actuator arm, there is a device 110 that effects a change in the opening and closing moment over the angle of rotation of the pivot-hung door panel.

Yet another feature of the invention resides broadly in the pivot-hung door drive system characterized by the fact that the device 110 is a transmission 112 that has different translation ratios.

Still another feature of the invention resides broadly in the pivot-hung door drive system characterized by the fact that the transmission 112 which varies its translation ratio over the angle of rotation of the pivot-hung door panel comprises a guide 3 that is connected with the output shaft 32 and a driver roller 120 that can execute a translation movement relative to the guide 30 and in the guide 30, which driver roller 120 is connected with a pinion engaged with a toothed rack 116 that is connected to the electro-mechanical or electro-hydraulic device, whereby the axis of rotation 34 of the output shaft 32 and the axis of rotation 24 of the pinion 118, and the axis of rotation 26 of the driver roller 120 and the axis of rotation 24 of the pinion 118 are at defined distances (E and F) from each other, such that when the pinion 118 is rotated, the translation ratio of the output shaft 32 changes as a result of the changing axial distance between the output shaft 32 and the driver roller 120.

A further feature of the invention resides broadly in the pivot-hung door drive system characterized by the fact that the transmission 112 which varies its translation ratio over the angle of rotation of the pivot-hung door panel comprises a guide 3 that is connected with the output shaft 32 and a driver roller 120 that can execute a translation movement relative to the guide 30 and in the guide 30, which driver roller 120 is connected with a pinion engaged with a toothed rack 116 that is connected to the electro-mechanical or electro-hydraulic device, whereby the axis of rotation 34 of the output shaft 32 and the axis of rotation 24 of the pinion 118, and the axis of rotation 26 of the driver roller 120 and the axis of rotation 24 of the pinion 118 are at defined distances (E and F) from each other, such that when the pinion 118 is rotated, the translation ratio of the output shaft 32 changes as a result of the changing the axial distance between the output shaft 32 and the driver roller 120.

Another feature of the invention resides broadly in the pivot-hung door drive system characterized by the fact that the axis of rotation 26 of the driver roller 2 intersects the pitch circle 28 of the pinion 118 and is oriented parallel to the axis of rotation 24 of the pinion 118.

Yet another feature of the invention resides broadly in the pivot-hung door drive system characterized by the fact that the translation ratio of the transmission 112 is determined by the diameter of the pitch circle 28 of the pinion 118, the distance F of the axis of rotation 34 of the output shaft 32 from the axis of rotation 24 of the pinion 118 and the distance E of the axis of rotation 24 of the driver roller 120 from the axis of rotation 24 of the pinion 118.

Still another feature of the invention resides broadly in the pivot-hung door drive system characterized by the realization of the pivot-hung door drive system with a lever arm which effectively varies over the range of rotation between a coupling point of the rotational door panel of the associated door and another coupling point outside the rotating panel, which lever arm is engaged with the output shaft 32.

A further feature of the invention resides broadly in the pivot-hung door drive characterized by the fact that the effective lever arm is formed by a slide-rail linkage.

Another feature of the invention resides broadly in the pivot-hung door drive characterized by the fact that the effective lever arm is formed by a toggle-lever linkage.

The copending U.S. patent application Ser. No. 09/482,365, having attorney docket No. NHL-DOR-66, a filing date of Jan. 13, 2000, the title "A DOOR DRIVE FOR A PIVOT-HUNG DOOR", inventors Jan Scholten, Peter Kisters and Guido Schneider, and assignee DORMA GmbH+Co. KG, Ennepetal, Federal Republic of Germany, and which claims priority from Federal Republic of Germany Patent Application No. 199 01 033.1, is hereby incorporated by reference as if set forth in its entirety herein.

Some examples of linkages or actuator arms which may be utilized or incorporated in a possible embodiment of the present invention may be found in the following U.S. patents: U.S. Pat. No. 5,417,013, issued to inventor Tillmann on May 23, 1995; U.S. Pat. No. 5,163,494, issued to inventors MacNeil et al. on Nov. 17, 1992; U.S. Pat. No. 5,149,180, issued to inventors Haab et al. on Sep. 22, 1992; U.S. Pat. No. 5,121,976, issued to inventors Haab et al. on Jun. 16, 1992; U.S. Pat. No. 5,058,238, issued to inventor Lautenschlager on Oct. 22, 1991; U.S. Pat. No. 4,821,375, issued to inventor Kozon on Apr. 18, 1989; U.S. Pat. No. 4,759,099, issued to inventors Morano et al. on Jul. 26, 1988; U.S. Pat. No. 4,669,147, issued to inventor Suchanek on Jun. 2, 1987; U.S. Pat. No. 4,419,787, issued to inventor Lieberman on Dec. 13, 1983; U.S. Pat. No. 4,285,094, issued to inventor Levings, Jr. on Aug. 25, 1981; U.S. Pat. No. 4,184,382, issued to inventor Redman on Jan. 22, 1980; and U.S. Pat. No. 4,080,687, issued to inventor Jentsch on Mar. 28, 1978.

Some examples of door closers which may be utilized or incorporated in a possible embodiment of the present invention may be found in the following U.S. patents: U.S. Pat. No. 5,832,561, issued to inventor Bienek on Nov. 10, 1998; U.S. Pat. No. 5,802,670, issued to inventor Bienek on Sep. 8, 1998; U.S. Pat. No. 5,770,934, issued to inventor Theile on Jun. 23, 1998; U.S. Pat. No. 5,651,216, issued to inventor Tillmann on Jul. 29, 1997; U.S. Pat. No. 5,428,278, issued to inventors Bollengier et al. on Jun. 27, 1995; U.S. Pat. No. 5,417,013, issued to inventor Tillmann on May 23, 1995; U.S. Pat. No. 5,251,400, issued to inventor Schultze on Oct. 12, 1993; U.S. Pat. No. 4,669,147, issued to inventor Suchanek on Jun. 2, 1987; U.S. Pat. No. 4,501,090, issued to inventors Yoshida et al. on Feb. 26, 1985; U.S. Pat. No. 4,419,787, issued to inventor Lieberman on Dec. 13, 1983; and U.S. Pat. No. 4,285,094, issued to inventor Levings, Jr. on Aug. 25, 1981. Some further examples of door closers which may be utilized or incorporated in a possible embodiment of the present invention may be found in the advertising brochure, entitled "Das Programm", for the company DORMA GmbH+Co. KG, Postfach 4009, D-58247 Ennepetal, Federal Republic of Germany, which advertising brochure bears the following identifying information: WN 051307, 12/96, Programm, D, 10, STB, 2/97, Atelier G. Heinz, Velbert, which advertising brochure describes, for example, on page 25, the door closer or drive system named the "DORMA ED 200".

Some examples of drives or electro-mechanical or electro-hydraulic drives which may be utilized or incorporated in a possible embodiment of the present invention may be found in the following U.S. patents: U.S. Pat. No. 5,666,268, issued to inventors Rix et al. on Sep. 9, 1997; U.S. Pat. No. 5,386,885, issued to inventors Bunzl et al. on Feb. 7, 1995; U.S. Pat. No. 5,521,400, issued to inventor Schultze on Oct. 12, 1993; U.S. Pat. No. 5,080,635, issued to inventors Martinez et al. on Jan. 14, 1992; U.S. Pat. No. 4,501,090, issued to inventors Yoshida et al. on Feb. 26, 1985; and U.S. Pat. No. 4,430,846, issued to inventors Presley et al. on Feb. 14, 1984.

Some examples of electronic control or electronic regulation systems which may be utilized or incorporated in a possible embodiment of the present invention may be found in the following U.S. patents: U.S. Pat. No. 5,770,934, issued to inventor Theile on Jun. 23, 1998; U.S. Pat. No. 5,666,268, issued to inventors Rix et al. on Sep. 9, 1997; U.S. Pat. No. 5,625,266, issued to inventor Stark on Apr. 29, 1997; U.S. Pat. No. 5,428,278, issued to inventors Bollengier et al. on Jun. 27, 1995; and U.S. Pat. No. 4,838,052, issued to inventors Williams et al. on Jun. 13, 1989.

Some examples of control systems which measure operating parameters and learn therefrom which may be utilized or incorporated in a possible embodiment of the present invention may be found in the following U.S. patents: U.S. Pat. No. 5,770,934, issued to inventor Theile on Jun. 23, 1998; U.S. Pat. No. 5,191,272, issued to inventors Torii et al. on Mar. 2, 1993; U.S. Pat. No. 5,223,820, issued to inventors Sutterlin et al. on Jun. 29, 1993; and U.S. Pat. No. 4,655,188, issued to inventors Tomisawa et al. on Apr. 7, 1987.

Some examples of memories which may be utilized or incorporated in a possible embodiment of the present invention may be found in the following U.S. patents: U.S. Pat. No. 5,789,887, issued to inventor Elischewski on Aug. 4, 1998; U.S. Pat. No. 5,770,934, issued to inventor Theile on Jun. 23, 1998; U.S. Pat. No. 5,453,736, issued to inventor Noren on Sep. 26, 1995; U.S. Pat. No. 5,315,220, issued to inventors Takimoto et al. on May 24, 1994; U.S. Pat. No. 4,994,724, issued to inventor Hsu on Feb. 19, 1991; U.S. Pat. No. 4,498,033, issued to inventors Aihara et al. on Feb. 5, 1985; and U.S. Pat. No. 4,328,540, issued to inventors Matsuoka et al. on May 4, 1982.

Some examples of microprocessors which may be utilized or incorporated in a possible embodiment of the present invention may be found in the following U.S. patents: U.S. Pat. No. 5,770,934, issued to inventor Theile on Jun. 23, 1998; U.S. Pat. No. 5,653,056, issued to inventor Stark on Aug. 5, 1997; U.S. Pat. No. 5,647,173, issued to inventors Stark et al. on Jul. 15, 1997; U.S. Pat. No. 5,625,266, issued to inventor Stark on Apr. 29, 1997; U.S. Pat. No. 5,479,151, issued to inventors Lavelle et al. on Dec. 26, 1995; U.S. Pat. No. 5,453,736, issued to inventor Noren on Sep. 26, 1995; U.S. Pat. No. 5,437,174, issued to inventor Aydin on Aug. 1, 1995; U.S. Pat. No. 5,274,312, issued to inventor Gerstenkorn on Dec. 28, 1993; U.S. Pat. No. 5,230,179, issued to inventors Richmond et al. on Jul. 27, 1993; U.S. Pat. No. 5,142,152, issued to inventor Boiucaner on Aug. 25, 1992; U.S. Pat. No. 5,140,173, issued to inventors Chau et al. on Aug. 18, 1992; U.S. Pat. No. 5,136,809, issued to inventors Richmond et al. on Aug. 11, 1992; U.S. Pat. No. 5,132,503, issued to inventor Lee on Jul. 21, 1992; U.S. Pat. No. 4,980,618, issued to inventors Milnes et al. on Dec. 25, 1990; U.S. Pat. No. 4,831,509, issued to inventors Jones et al. on May 16, 1989; U.S. Pat. No. 4,815,046, issued to inventor Dorr on Mar. 21, 1989; and U.S. Pat. No. 4,779,240, issued to inventor Dorr on Oct. 18, 1988.

Some examples of open-loop control systems which may be utilized or incorporated in a possible embodiment of the present invention may be found in the following U.S. patents: U.S. Pat. No. 5,770,934, issued to inventor Theile on Jun. 23, 1998; U.S. Pat. No. 5,210,473, issued to inventor Backstrand on May 11, 1993; U.S. Pat. No. 5,320,186, issued to inventors Strosser et al. on Jun. 14, 1994; and U.S. Pat. No. 5,369,342, issued to inventors Rudzewicz et al. on Nov. 29, 1994.

Some examples of closed-loop control circuits which may be utilized or incorporated in a possible embodiment of the present invention may be found in the following U.S. patents: U.S. Pat. No. 5,770,934, issued to inventor Theile on Jun. 23, 1998; U.S. Pat. No. 5,189,605, issued to inventors Zuehlke et al. on Feb. 23, 1993; U.S. Pat. No. 5,223,072, issued to inventors Brockman et al. on Jun. 29, 1993; and U.S. Pat. No. 5,252,901, issued to inventors Ozawa et al. on Oct. 12, 1993.

Some examples of look up tables accessed by computers or microprocessors which may be utilized or incorporated in a possible embodiment of the present invention may be found in the following U.S. patents: U.S. Pat. No. 5,284,116, issued to inventor Richeson, Jr. on Feb. 8, 1994; U.S. Pat. No. 5,359,325, issued to inventors Ford et al. on Oct. 25, 1994; and U.S. Pat. No. 5,371,537, issued to inventors Bohan et al. on Dec. 6, 1994.

Some examples of sensors, sensor systems, pressure sensing apparatuses, and/or strain gauges which may be utilized or incorporated in a possible embodiment of the present invention may be found in the following U.S. patents: U.S. Pat. No. 5,770,934, issued to inventor Theile on Jun. 23, 1998; U.S. Pat. No. 5,625,266, issued to inventor Stark on Apr. 29, 1997; U.S. Pat. No. 5,428,278, issued to inventors Bollengier et al. on Jun. 27, 1995; U.S. Pat. No. 5,303,593, issued to inventor Kremidas on Apr. 19, 1994; U.S. Pat. No. 5,287,757, issued to inventors Polaert et al. on Feb. 22, 1994; U.S. Pat. No. 5,251,400, issued to inventor Schultze on Oct. 12, 1993; U.S. Pat. No. 5,241,308, issued to inventor Young on Aug. 31, 1993; U.S. Pat. No. 5,199,519, issued to inventors Polaert et al. on Apr. 6, 1993; U.S. Pat. No. 5,191,798, issued to inventors Tabata et al. on Mar. 9, 1993; U.S. Pat. No. 5,186,060, issued to inventor Marlier on Feb. 16, 1993; U.S. Pat. No. 5,142,152, issued to inventor Boiucaner on Aug. 25, 1992; U.S. Pat. No. 4,815,046, issued to inventor Dorr on Mar. 21, 1989; U.S. Pat. No. 4,779,240, issued to inventor Dorr on Oct. 18, 1988; U.S. Pat. No. 4,501,090, issued to inventors Yoshida et al. on Feb. 26, 1985, and U.S. Pat. No. 4,430,846, issued to inventors Presley et al. on Feb. 14, 1984.

Some examples of devices or transmissions which may be utilized or incorporated in a possible embodiment of the present invention may be found in the following U.S. patents: U.S. Pat. No. 4,763,385, issued to inventors Furch et al. on Aug. 16, 1988, and U.S. Pat. No. 4,744,125, issued to inventors Scheck et al. on May 17, 1988.

Some examples of housing or access panels which may be utilized or incorporated in a possible embodiment of the present invention may be found in the following U.S. patent: U.S. Pat. No. 5,327,682, issued on Jul. 12, 1994.

Some examples of guide rails or systems for door, wall or partition systems which may be utilized or incorporated in a possible embodiment of the present invention may be found in the following U.S. patents: U.S. Pat. No. 5,538,064, issued to inventor Salice on Jul. 23, 1996; U.S. Pat. No. 5,327,681, issued to inventor Minami on Jul. 12, 1994; U.S. Pat. No. 4,759,099, issued to inventors Morano et al. on Jul. 26, 1988; U.S. Pat. No. 4,555,828, issued to inventor Matimura on Dec. 3, 1985; and U.S. Pat. No. 4,084,289, issued to inventor Naimo on Apr. 18, 1978.

Some examples of doors, foldable doors, or door systems and mechanisms and devices for their operation which may be utilized or incorporated in a possible embodiment of the present invention may be found in the following U.S. patents: U.S. Pat. No. 5,762,123, issued to inventors Kuyama et al. on Jun. 9, 1998; U.S. Pat. No. 5,651,216, issued to inventor Tillmann on Jul. 29, 1997; U.S. Pat. No. 5,186,230, issued to inventor Ostrander on Feb. 16, 1993; U.S. Pat. No. 5,165,142, issued to inventor Pilsbury on Nov. 24, 1992; U.S. Pat. No. 5,163,494, issued to inventors MacNeil et al. on Nov. 17, 1992; U.S. Pat. No. 5,099,903, issued to inventor Chen on Mar. 31, 1992; U.S. Pat. No. 5,070,926, issued to inventor Behring on Dec. 10, 1991; and U.S. Pat. No. 4,932,455, issued to inventor Yamada on Jun. 12, 1990.

Some examples of movable partition or wall systems and devices for their operation which may be utilized or incorporated in a possible embodiment of the present invention may be found in the following U.S. patents: U.S. Pat. No. 5,730,027, issued to inventor Hormann on Mar. 24, 1998; U.S. Pat. No. 5,461,829, issued to inventors Lehto et al. on Oct. 31, 1995; U.S. Pat. No. 5,404,675, issued to inventor Schmidhauser on Apr. 11, 1995; U.S. Pat. No. 5,329,857, issued to inventor Owens on Jul. 19, 1994; U.S. Pat. No. 5,295,281, issued to inventor Kordes on Mar. 22, 1994; U.S. Pat. No. 5,394,648, issued to inventor Kordes on Mar. 7, 1995; U.S. Pat. No. 5,417,013, issued to inventor Tillmann on May 23, 1995; U.S. Pat. No. 5,544,462, issued to inventor Kordes on Aug. 13, 1996; U.S. Pat. No. 5,406,761, issued to inventors Hobbiebrunken et al. on Apr. 18, 1995; U.S. Pat. No. 5,152,332, issued to inventor Siener on Oct. 6, 1992; U.S. Pat. No. 5,042,555, issued to inventor Owens on Aug. 27, 1991; U.S. Pat. No. 4,934,119, issued to inventor Ybarra on Jun. 19, 1990; U.S. Pat. No. 4,914,878, issued to inventors Tamaki et al. on Apr. 10, 1990; U.S. Pat. No. 4,895,246, issued to inventor Rizzi on Jan. 23, 1990; U.S. Pat. No. 4,752,987, issued to inventors Dreyer et al. on Jun. 28, 1988; U.S. Pat. No. 4,596,094, issued to inventors Teller et al. on Jun. 24, 1986; U.S. Pat. No. 4,555,828, issued to inventor Matimura on Dec. 3, 1985; U.S. Pat. No. 4,458,462, issued to inventor Schold on Jul. 10, 1984; U.S. Pat. No. 4,404,770, issued to inventor Markus on Sep. 20, 1983; and U.S. Pat. No. 4,112,647, issued to inventor Scheid on Sep. 12, 1978.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 199 01 229.6, filed on Jan. 14, 1999, having inventors Jan Scholten and Peter Kisters, and DE-OS 199 01 229.6 and DE-PS 199 01 229.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A pivot-hung door drive system with an electro-mechanical or electro-hydraulic drive device that is configured to supply the opening and closing moment required to open and close a connected pivot-hung door panel, said drive system comprising:

an electronic control system comprising at least one memory, at least one microprocessor, and at least one sensor, all operatively interconnected together;

said at least one memory being configured and disposed to store at least one characteristic of operation of said drive system;

said at least one microprocessor being configured and disposed to control said drive system;

said at least one sensor being configured and disposed to indicate at least one operating status of a connected door panel to said at least one microprocessor;

a motor arrangement configured and disposed to operatively drive a door panel;

a drive arrangement connected to said motor arrangement, said drive arrangement being configured and disposed to be driven by said motor arrangement;

a transmission arrangement connected to said drive arrangement, said transmission arrangement being configured and disposed to be driven by said drive arrangement;

a linkage configured and disposed to move a door panel, said linkage being connected to said transmission arrangement and said linkage being configured and disposed to be driven by said transmission arrangement;

said transmission arrangement comprising an input arrangement and an output arrangement;

said input arrangement being connected to said drive arrangement;

said output arrangement being connected to said linkage; and said transmission arrangement comprising at least one gear wheel being configured and disposed to change the relationship between the movement of said input arrangement and said output arrangement dependent upon the position and angle of rotation of one of said input arrangement and said output arrangement to provide differences in the opening and closing moments of said output arrangement over rotation of a door panel dependent upon the position of said output arrangement and the angle of rotation of said output arrangement to minimize force provided by said drive arrangement to close a door.

2. The pivot-hung door drive system according to claim 1, wherein:

said input arrangement has an angle of movement;

said output arrangement has an angle of movement; and said at least one gear wheel to change the relationship between the movement of said input arrangement and said output arrangement comprises at least one gear wheel to change the angle of movement of said output arrangement and the angle of movement of said input arrangement to provide different translation ratios between said input arrangement and said output arrangement dependent upon a position of said output arrangement within the angle of movement of said output arrangement.

3. The pivot-hung door drive system according to claim 2, wherein:

said at least one gear wheel comprises a first gear wheel and a second gear wheel;

said first gear wheel is configured and disposed to engage with said second gear wheel to provide different translation ratios between said input arrangement and said output arrangement dependent upon a position of said output arrangement within the angle of movement of said output arrangement;

said gear wheels are configured and disposed to be engaged with one another substantially constantly throughout 360° of rotation of said gear wheels;

each of said gear wheels comprises a curvilinear gear rim;

each of said gear wheels has a geometric center point;

each of said gear wheels has an axis of rotation about which each of said gear wheels rotates;

each of said gear wheels is mounted at the axis of rotation;

each of said axes of rotation is disposed a substantial predetermined distance from its corresponding geometric center point;

said output arrangement comprises an output shaft;

said output shaft is connected to said second gear wheel;

said output shaft is disposed coaxially with respect to the axis of rotation of said second gear wheel;

said drive arrangement comprises a drive gear;

said drive gear is configured and disposed to operatively connect to said first gear wheel; and said drive gear is disposed coaxially with respect to the axis of rotation of said first gear wheel.

4. The pivot-hung door drive system according to claim 3, wherein:

each of said gear wheels has a corresponding pitch circle disposed about said axis of rotation;

said pitch circle of said first gear wheel is disposed to intersect substantially tangentially with said pitch circle of said second gear wheel;

said intersection of said Ditch circles forms a pitch point;

each said axis of rotation and its corresponding geometric center point are configured and disposed to provide an eccentricity; and each of said geometric center points of each of said gear wheels lies centrically symmetric to the pitch point to produce eccentricity.

5. The pivot-hung door drive system according to claim 4, wherein:

said pivot-hung door drive system is a top-mounted pivot-hung door drive system; and said top-mounted pivot-hung door drive system comprises:

a lever arm;

said lever arm is configured and disposed to effectively vary over the range of rotation between a coupling point of a door panel and another coupling point outside a door panel; and said lever arm is engaged with the output shaft.

6. The pivot-hung door drive system according to claim 5, wherein said lever arm is formed by a slide-rail linkage.

7. The pivot-hung door drive system according to claim 5, wherein said lever arm is formed by a toggle-lever linkage.

8. The pivot-hung door drive system according to claim 4, wherein:

said pivot-hung door drive system comprises an underfloor drive; and said output shaft is configured and disposed to interact with a bearing of a door panel.

9. The pivot-hung door drive system according to claim 5, wherein:

each of said gear wheels has a standard gearing according to DIN 867; and the ratio of the magnitude of the eccentricity provided by the predetermined distance between the geometric center points and the axes of rotation to the base circle diameter is not substantially greater than 0.137.

10. A pivot-hung door drive system with an electromechanical or electro-hydraulic drive device configured to supply the opening and closing moment required to open and close a connected pivot-hung door panel, said drive system comprising:

a motor arrangement configured and disposed to operatively drive a door panel;

a drive arrangement connected to said motor arrangement, said drive arrangement being configured and disposed to be driven by said motor arrangement;

a transmission arrangement connected to said drive arrangement, said transmission arrangement being configured and disposed to be driven by said drive arrangement;

a linkage configured and disposed to move a door panel, said linkage being connected to said transmission arrangement and said linkage being configured and disposed to be driven by said transmission arrangement;

said transmission arrangement comprising an input arrangement and an output arrangement;

said input arrangement being connected to said drive arrangement;

said output arrangement being connected to said linkage; and said transmission arrangement comprising at least one gear wheel being configured and disposed to change the relationship between the movement of said input arrangement and said output arrangement dependent upon the position and angle of rotation of one of said input arrangement and said output arrangement to provide differences in the opening and closing moments of said output arrangement over rotation of a door panel dependent upon the position of said output arrangement and the angle of rotation of said output arrangement.

11. The pivot-hung door drive system according to claim 10, wherein:

said input arrangement has an angle of movement;

said output arrangement has an angle of movement; and said at least one gear wheel to change the relationship between the movement of said input arrangement and said output arrangement comprises at least one gear wheel to change the angle of movement of said output arrangement and the angle of movement of said input arrangement to provide different translation ratios between said input arrangement and said output arrangement dependent upon a position of said output arrangement within the angle of movement of said output arrangement.

12. The pivot-hung door drive system according to claim 11, wherein:

said at least one gear wheel comprises a first gear wheel and a second gear wheel;

said first gear wheel is configured and disposed to engage with said second gear wheel to provide different translation ratios between said input arrangement and said output arrangement dependent upon a position of said output arrangement within the angle of movement of said output arrangement;

said gear wheels are configured and disposed to be engaged with one another substantially constantly throughout 360° of rotation of said gear wheels;

each of said gear wheels comprises a curvilinear gear rim;

each of said gear wheels has a geometric center point;

each of said gear wheels has an axis of rotation about which each of said gear wheels rotates;

each of said gear wheels is mounted at the axis of rotation;

each of said axes of rotation is disposed a substantial predetermined distance from its corresponding geometric center point;

said output arrangement comprises an output shaft;

said output shaft is connected to said second gear wheel;

said output shaft is disposed coaxially with respect to the axis of rotation of said second gear wheel;

said drive arrangement comprises a drive gear;

said drive gear is configured and disposed to operatively connect to said first gear wheel; and said drive gear is disposed coaxially with respect to the axis of rotation of said first gear wheel.

13. The pivot-hung door drive system according to claim 12, wherein:

each of said gear wheels has a corresponding pitch circle disposed about said axis of rotation;

said pitch circle of said first gear wheel is disposed to intersect substantially tangentially with said pitch circle of said second gear wheel;

said intersection of said pitch circles forms a pitch point;

each said axis of rotation and its corresponding geometric center point are configured and disposed to provide an eccentricity; and each of said geometric center points of each of said gear wheels lies centrically symmetric to the pitch point to produce eccentricity.

14. The pivot-hung door drive system according to claim 13, wherein:

said pivot-hung door drive system is a top-mounted pivot-hung door drive system; and said top-mounted pivot-hung door drive system comprises:

a lever arm;

said lever arm is configured and disposed to effectively vary over the range of rotation between a coupling point of a door panel and another coupling point outside a door panel;

said lever arm is engaged with the output shaft; and said lever arm is formed by one of:

a) a slide-rail linkage; and b) a toggle-lever linkage.

15. The pivot-hung door drive system according to claim 13, wherein:

said pivot-hung door drive system comprises an under-floor drive; and said output shaft is configured and disposed to interact with a bearing of a door panel.

16. The pivot-hung door drive system according to claim 15, wherein:

each of said gear wheels has a standard gearing according to DIN 867; and the ratio of the magnitude of the eccentricity provided by the predetermined distance between the geometric center points and the axes of rotation to the base circle diameter is not substantially greater than 0.137.

17. A pivot-hung door drive system with an electro-mechanical or electro-hydraulic drive device configured to supply the opening and closing moment required to open and close a connected pivot-hung door panel, said drive system comprising:

a motor arrangement configured and disposed to operatively drive a door panel;

a drive arrangement connected to said motor arrangement, said drive arrangement being configured and disposed to be driven by said motor arrangement;

an arrangement connected to said drive arrangement, said arrangement being configured and disposed to be driven by said drive arrangement;

a linkage configured and disposed to move a door panel, said linkage being connected to said arrangement and said linkage being configured and disposed to be driven by said arrangement;

said arrangement comprising an input arrangement and an output shaft;

said input arrangement being connected to said drive arrangement; and said arrangement comprising at least one gear wheel being configured and disposed to change the relationship between the movement of said input arrangement and said output shaft dependent upon the position and angle of rotation of one of said input arrangement and said output shaft to provide differences in the opening and closing moments of said output shaft over rotation of a door panel dependent upon the position of said output shaft and the angle of rotation of said output shaft.

18. The pivot-hung door drive system according to claim 17, wherein:

said input arrangement has an angle of movement;

said output shaft has an angle of movement; and said at least one gear wheel to change the relationship between the movement of said input arrangement and said output shaft comprises at least one gear wheel to change the angle of movement of said output shaft and the angle of movement of said input arrangement to provide different translation ratios between said input arrangement and said output shaft dependent upon a position of said output shaft within the angle of movement of said output shaft.

19. The pivot-hung door drive system according to claim 18, wherein:

said at least one gear wheel comprises a first gear wheel and a second gear wheel;

said first gear wheel is configured and disposed to engage with said second gear wheel to provide different translation ratios between said input arrangement and said output arrangement dependent upon a position of said output arrangement within the angle of movement of said output arrangement;

said gear wheels are configured and disposed to be engaged with one another substantially constantly throughout 360° of rotation of said gear wheels;

each of said gear wheels comprises a curvilinear gear rim;

each of said gear wheels has a geometric center point;

each of said gear wheels has an axis of rotation about which each of said gear wheels rotates;

each of said gear wheels is mounted at the axis of rotation;

each of said axes of rotation is disposed a substantial predetermined distance from its corresponding geometric center point;

said output shaft is connected to said second gear wheel;

said output shaft is disposed coaxially with respect to the axis of rotation of said second gear wheel;

said drive arrangement comprises a drive gear;

said drive gear is configured and disposed to operatively connect to said first gear wheel; and said drive gear is disposed coaxially with respect to the axis of rotation of said first gear wheel.

20. The pivot-hung door drive system according to claim 19, wherein:

each of said gear wheels has a corresponding pitch circle disposed about said axis of rotation;

said pitch circle of said first gear wheel is disposed to intersect substantially tangentially with said pitch circle of said second gear wheel;

said intersection of said pitch circles forms a pitch point;

each said axis of rotation and its corresponding geometric center point are configured and disposed to provide an eccentricity;

each of said geometric center points of each of said gear wheels lies centrically symmetric to the pitch point to produce eccentricity;

each of said gear wheels has a standard gearing according to DIN 867;

the ratio of the magnitude of the eccentricity provided by the predetermined distance between the geometric center points and the axes of rotation to the base circle diameter is not substantially greater than 0.137; and said pivot-hung door drive system is one of:

c) a top-mounted pivot-hung door drive system, which said top-mounted pivot-hung door drive system comprises:

a lever arm;

said lever arm is configured and disposed to effectively vary over the range of rotation between a coupling point of a door panel and another coupling point outside a door panel;

said lever arm is engaged with said output shaft; and said lever arm is formed by one of:

e) a slide-rail linkage; and f) a toggle-lever linkage; or d) an underfloor drive system, wherein said output shaft is configured and disposed to interact with a bearing of a door panel.

* * * * *

UNITED STATES PATENT AND TRADEMARK OFFICE

CERTIFICATE OF CORRECTION

PATENT NO. : 6,338,693 B1
DATED : January 15, 2002

INVENTOR(S) : Jan Scholten and Peter Kisters

It is certified that error appears in the above-identified patent and that said Letters Patent is hereby corrected as shown below:

<u>Column 4,</u>
Line 36, after the second occurrence of “the”delete “Ditch” and insert -- pitch --.

<u>Column 7,</u>
Line 59, after “bearing”, delete “(no-” and insert -- (not --.

<u>Column 19,</u>
Line 34, after the second occurrence of “said”, delete “Ditch” and insert -- pitch --.

Signed and Sealed this

Third Day of December, 2002

JAMES E. ROGAN
*Director of the United States Patent and Trademark Office*